United States Patent
Wada (10) Patent No.: US 12,129,050 B2
(45) Date of Patent: Oct. 29, 2024

(54) PASSENGER BOARDING BRIDGE HAVING APPROACH CONTROL FUNCTION

(71) Applicant: ANA MOTOR SERVICE CO., LTD., Tokyo (JP)

(72) Inventor: Masafumi Wada, Tokyo (JP)

(73) Assignee: ANA MOTOR SERVICE CO., LTD., Tokyo (JP)

( * ) Notice: Subject to any disclaimer, the term of this patent is extended or adjusted under 35 U.S.C. 154(b) by 604 days.

(21) Appl. No.: 17/430,712

(22) PCT Filed: Feb. 13, 2020

(86) PCT No.: PCT/JP2020/005510
§ 371 (c)(1),
(2) Date: Aug. 12, 2021

(87) PCT Pub. No.: WO2020/166656
PCT Pub. Date: Aug. 20, 2020

(65) Prior Publication Data
US 2022/0144453 A1    May 12, 2022

(30) Foreign Application Priority Data
Feb. 14, 2019    (JP) .................. 2019-024355

(51) Int. Cl.
*B64F 1/305* (2006.01)
*B64F 1/00* (2006.01)

(52) U.S. Cl.
CPC ............ *B64F 1/3055* (2013.01); *B64F 1/002* (2013.01)

(58) Field of Classification Search
CPC .............................. B64F 1/002; B64F 1/3055
See application file for complete search history.

(56) References Cited

U.S. PATENT DOCUMENTS

| 3,683,440 | A | * | 8/1972 | Xenakis | ................ | B64F 1/3055 |
| | | | | | | 14/71.5 |
| 5,105,495 | A | * | 4/1992 | Larson | .................... | B64F 1/305 |
| | | | | | | 14/71.5 |
| 7,137,162 | B2 | * | 11/2006 | Spencer | ................ | B64F 1/3055 |
| | | | | | | 14/71.5 |

(Continued)

FOREIGN PATENT DOCUMENTS

| CA | 2 476 879 A1 | 9/2003 |
| DE | 10 2017 201037 A1 | 8/2017 |

(Continued)

OTHER PUBLICATIONS

The extended European search report issued by the European Patent Office on Feb. 25, 2022, which corresponds to European Patent Application No. 20755813.1-1010 and is related to U.S. Appl. No. 17/430,712.

(Continued)

*Primary Examiner* — Raymond W Addie
(74) *Attorney, Agent, or Firm* — Studebaker & Brackett PC (57) ABSTRACT

The passenger boarding includes a rotunda, a tunnel portion, a cab and a first detection device configured to detect an angle of the rotunda from the first axis around an origin point, and a second detector configured to measure a distance of the tunnel from the origin point in the extensible/contractable direction, provided at the tunnel.

6 Claims, 11 Drawing Sheets

(56) References Cited

U.S. PATENT DOCUMENTS

| | | | |
|---|---|---|---|
| 7,458,122 B2* | 12/2008 | Hutton | B64F 1/305 340/686.2 |
| 9,746,846 B1* | 8/2017 | Truscott | G05B 19/042 |
| 10,875,666 B2 | 12/2020 | Sonoda | |
| 2003/0145405 A1 | 8/2003 | Hutton | |
| 2003/0208860 A1 | 11/2003 | Hutton et al. | |
| 2005/0198750 A1* | 9/2005 | Spencer | B64F 1/3055 14/71.5 |
| 2007/0210952 A1* | 9/2007 | Hutton | G08G 5/0013 342/23 |
| 2008/0109970 A1 | 5/2008 | Hutton | |
| 2010/0325818 A1* | 12/2010 | Okahira | B64F 1/3055 14/71.5 |
| 2018/0371712 A1* | 12/2018 | Glatfelter | B64F 1/3055 |
| 2020/0165009 A1 | 5/2020 | Sonoda | |

FOREIGN PATENT DOCUMENTS

| | | |
|---|---|---|
| JP | 2018-039310 A | 3/2018 |
| WO | 2017/137241 A1 | 8/2017 |
| WO | 2019/012648 A1 | 1/2019 |

OTHER PUBLICATIONS

International Preliminary Report on Patentability and Written Opinion issued in PCT/JP2020/005510; issued Aug. 10, 2021.
International Search Report issued in PCT/JP2020/005510; mailed Mar. 17, 2020.

* cited by examiner

PASSENGER BOARDING BRIDGE HAVING APPROACH CONTROL FUNCTION

TECHNICAL FIELD

The present invention relates to a passenger boarding bridge for a passenger aircraft, set up in an airport, especially a passenger boarding bridge for a passenger aircraft having an approach control function.

BACKGROUND ART

A passenger aircraft (hereinafter referred to as an aircraft) allows passengers to embark on or disembark from the aircraft (hereinafter simply referred to as "to board" or "boarding") through an opening at a passenger door provided on the aircraft. A passenger boarding bridge (hereinafter referred to as "PBB") is provided between the opening at the passenger door and a gate of an airport building provided in the airport building. The PBB is retracted at a stand-by position where the PBB is away from the aircraft in the case where passengers do not board, while it extends to a boarding-permission position from the stand-by position to contact the passenger door in the case where passengers are on boarding, the boarding-permission position allowing the passengers to board. The PBB is kept to be stable at the position where it conforms the position of the passenger door to allow the passengers to board through the passenger door.

SUMMARY OF INVENTION

Technical Problem

When an aircraft in which passengers embarked reaches a scheduled aircraft parking apron, a PBB is required to approach a predetermined boarding-permission position and connect to the body of the aircraft for a short period precisely. In this approach process, however, it is relied on senses of an operator of a PBB. Even though an operator has enough skills on many operation-experiences, a mistake or a mis-operation is caused by preconception. Also, conventionally, according to operators of PBBs, approach routes to an aircraft from the stand-by position to the boarding-permission position are different.

Solution to Problem

In this context, it is provided, a passenger boarding bridge which moves from a stand-by position away from an aircraft to a target position in a virtual coordinate having an origin point that is an intersecting point of a first axis parallel to a surface of an aircraft parking apron and a second axis perpendicular to the first axis, the aircraft being at a stop at a predetermined position on the aircraft parking apron with regard to a building of an airport, including a rotunda rotatably attached to the building around an axis extending from the origin point, the axis perpendicular to the first and second axes; a tunnel portion whose one end is connected to the rotunda, the tunnel portion having a drive wheel and a steering supporting the drive wheel to rotate the drive wheel around a vertical axis and extensible and contractable in an extensible/contractable direction extending from the origin point by a drive of the drive wheel; a cab connected to another end of the tunnel portion and having a connection portion contactable and opposed to a side surface of the aircraft, the connection portion rotatable between a nose side and a tail side of the aircraft with regard to the tunnel portion; a control device configured to control a rotation angle of the steering and a drive of the drive wheel in a forward/backward direction; a memory device storing a target position coordinate data including a distance from the origin point to the target position in a direction along the first axis and a distance from the origin point to the target position in a direction along the second axis; and a first detection device configured to detect an angle of the rotunda from the first axis around an origin point, and a second detector configured to measure a distance of the tunnel from the origin point in the extensible/contractable direction, provided at the tunnel.

Advantageous Effects of Invention

It is provided, a PBB enabling to move a predetermined boarding-permission position of an aircraft for a short period precisely with a simple structure.

DESCRIPTION OF EMBODIMENTS

Figure 1:
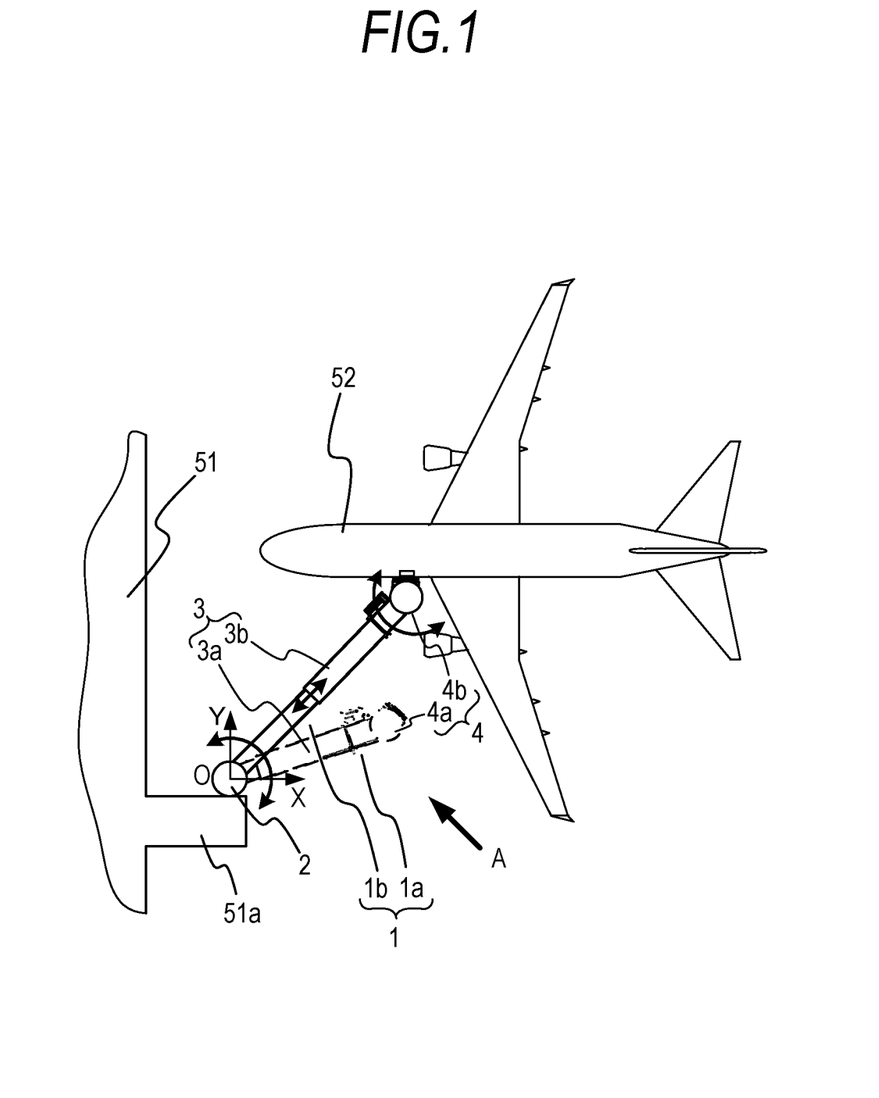
FIG. 1 is a drawing to show the relationship between the PBB as the present invention, an aircraft and a building in an airport.
Figure 2:
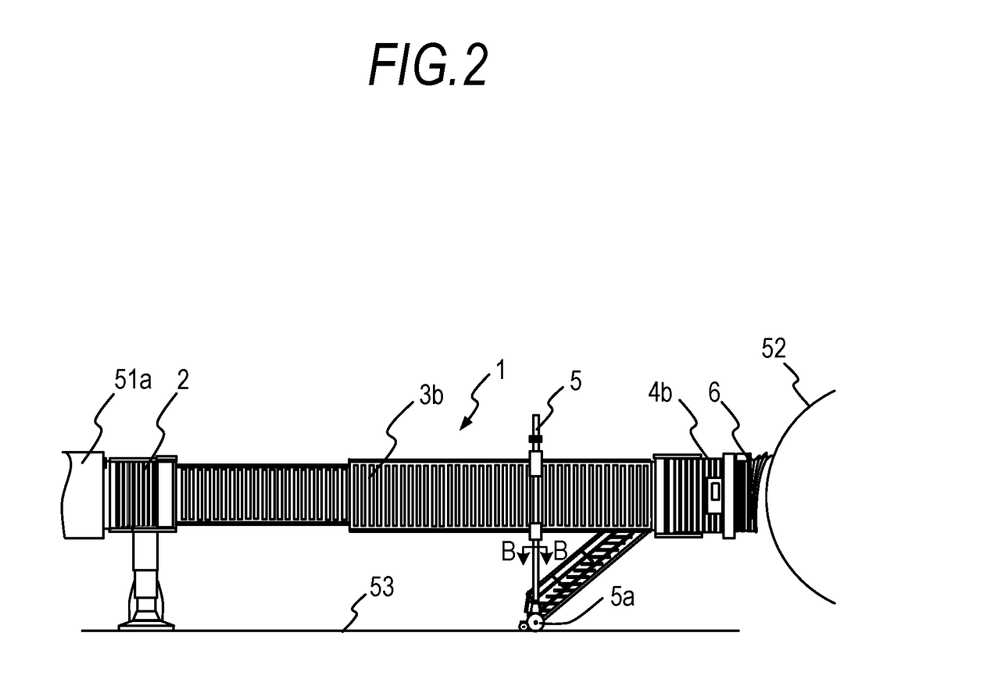
FIG. 2 is a drawing to show the side surface of the PBB.
Figure 3:
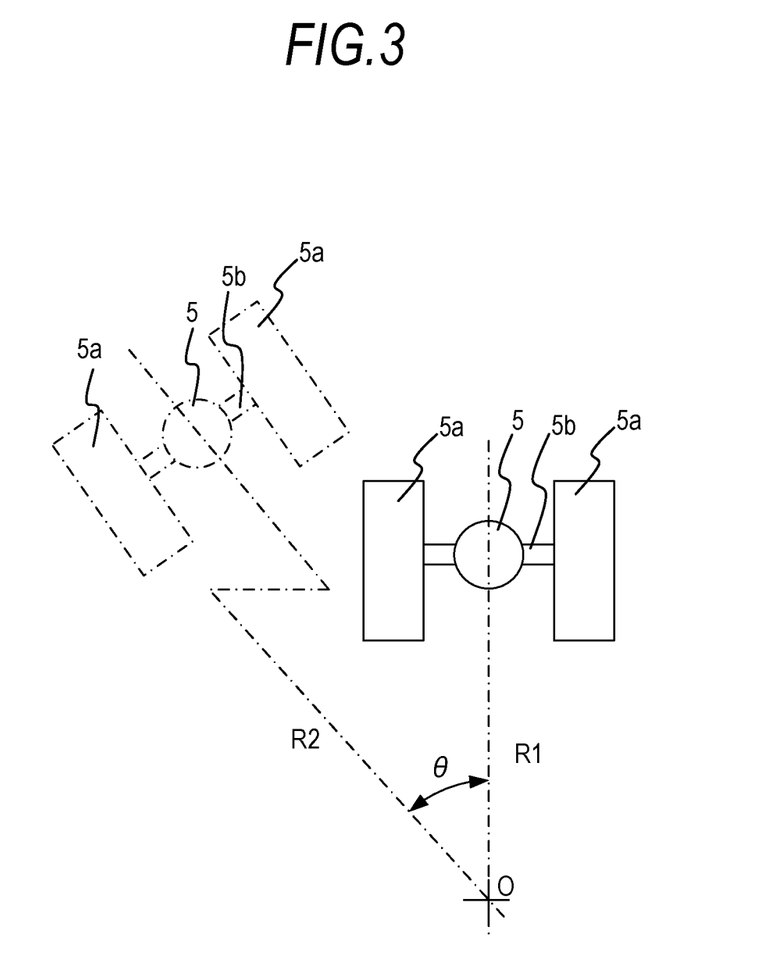
FIG. 3 is a drawing to show a movable zone structure of the drive column.

With reference to FIGS. 1 to 3, the embodiment of the present invention is explained as below. FIG. 1 shows PBB1 in the present invention with the relationship between the airport building 51 and the aircraft 52 parked at the parking apron. In FIG. 1, the state of PBB 1 contracted in a stand-by position is shown by the broken line PBB1a, while the state where the PBB 1 is connected to the passenger door at the boarding-permission position in which passengers are on-board is shown by the solid line PBB1b. FIG. 2 shows the PBB1 at the boarding-permission position in which the PBB 1 extends from the stand-by position to connect to the aircraft (corresponding to PBB1b in FIG. 1), the view (PBB1b) arrowed with A in FIG. 1. FIG. 3 shows the drive column 5 shown in a vertical direction of the parking apron surface 53, corresponding to the cross-section B of FIG. 2. In this specification, the PBB 1 is movable in the X-Y coordinate as a virtual coordinate-system having the origin point O at which an X axis intersects with a Y axis are defined, the X axis (a first axis) being parallel to the parking apron surface 53 on which the wheels of an aircraft 52 contact with regard to the airport building 51, while the Y axis (a second axis) being parallel to the parking apron surface 53 and perpendicular to the X axis. The X axis can generally be defined as the nose-to-tail direction of the aircraft parked at the predetermined parking position in which passengers can be on board.

The PBB 1 includes the rotunda 2, the tunnel portion 3 and the cab 4. The rotunda 2 is rotatably attached on the fixed bridge 51a protruding from the airport building 51, around the axis extending vertically from the origin point O and crossing the X axis and Y axis, that is around the origin point O in the view from the vertical direction onto the parking apron surface.

The tunnel portion 3, for example, includes the outer tunnel and the inner tunnel which are hollow members in which passengers walk inside. The outer tunnel has a larger outer shape than the cross-section of the inner tunnel, whereby the inner tunnel is inserted from one end of the outer tunnel into the outer tunnel telescopically. The one end of the inner tunnel of the tunnel portion 3 is connected to the rotunda 2. The drive column 5 is supported and fixed on the outer tunnel. The drive column 5 has a pair of the drive wheels 5a configured to move on the parking apron surface 53 and a steering 5b supporting the drive wheels 5a. The both wheels of the pair of the drive wheels 5a supported by the steering 5b rotate in the same rotation speed. The steering 5b is a rod member as an axis parallel to the parking apron surface 53, so that it is rotatable around the vertical axis of the steering 5b vertically extending to the parking apron surface 53. The drive wheels 5a is rotatable around the steering 5b. The drive column 5 moves in the direction in which the tunnel portion 3 comes close to or gets away from the rotunda 2 by making the drive wheels 5a run on the parking apron surface 53, so that the outer tunnel contracts so as to cover the inner tunnel, or extends so as to expose the inner tunnel, that is the tunnel portion 3 is extensible or contractable in the extensible/contractable direction of the tunnel portion 3 passing through the origin point O. Also, the rotunda 2 rotates around the origin point O so that the tunnel portion 3 is rotatable around the origin point O.

The cab 4 is connected to the other end (another end) of tunnel portion 3 that is opposite to the one end to which the rotunda 2 is connected. The cab 4 has a connection portion 6 contactable to face to the side of the aircraft 52. The cab 4 is rotatable around the outer tunnel of the tunnel portion 3 between the direction in which the connection portion 6 directs the nose side and the direction in which the connection portion 6 directs the tail side with regard to the tunnel portion 3. The cab 4 has an opening communicating the tunnel portion 3 so that passengers boards on the aircraft through the opening and the passenger door. The connection portion 6 has an accordion-folded member provided around the opening. By rotating the cab 4, the opening is moves at a position at which the opening faces to the passenger door of the aircraft 52 so that the connection portion 4 extends to contact the aircraft to isolate the inside of the PBB 1 from the outside. When passengers disembark from the aircraft, they move from the cab 4 to the rotunda 2 through the tunnel portion 3.

The PBB 1 has a control device (not shown) and a memory device (not shown). The control device controls the rotation angle of the steering 5b and the drive of the drive wheels 5a in the forward/backward direction, while the memory device stores target position coordinate data including the distances of the target position from the origin point O in the X axis and the Y axis with regard to the aircraft on which the connection portion 6 of the cab 4 of the PBB 1 is to contact. The tunnel portion 3 has a first detection device (not shown) and a second detection device (not shown). For example, the first detection device is a potentiometer or a rotary-encoder that can detect an angle θ of the rotunda 2 from the X axis around the origin point O. For example, the second detection device is a potentiometer or a length-measurement sensor that can measure a distance of the tunnel portion 3 from the origin point O in the extensible/contractable direction. The first detection device and the second detection device can be attached at any portion of the tunnel portion 3. Representatively, they can be attached on the steering 5b. In order to identify the position of the PBB 1, it is preferable to provide the first detection device and the second detection device at a portion to be referenced (a reference portion) at the most representable position of the PBB 1. An example of the reference portion is a position of the drive column 5 that is a rotation center of the steering 5b. In the following description, the present invention is explained by defining the position of the PBB 1 based on the reference position in the X-Y coordinate with the origin point O.

Figure 4:
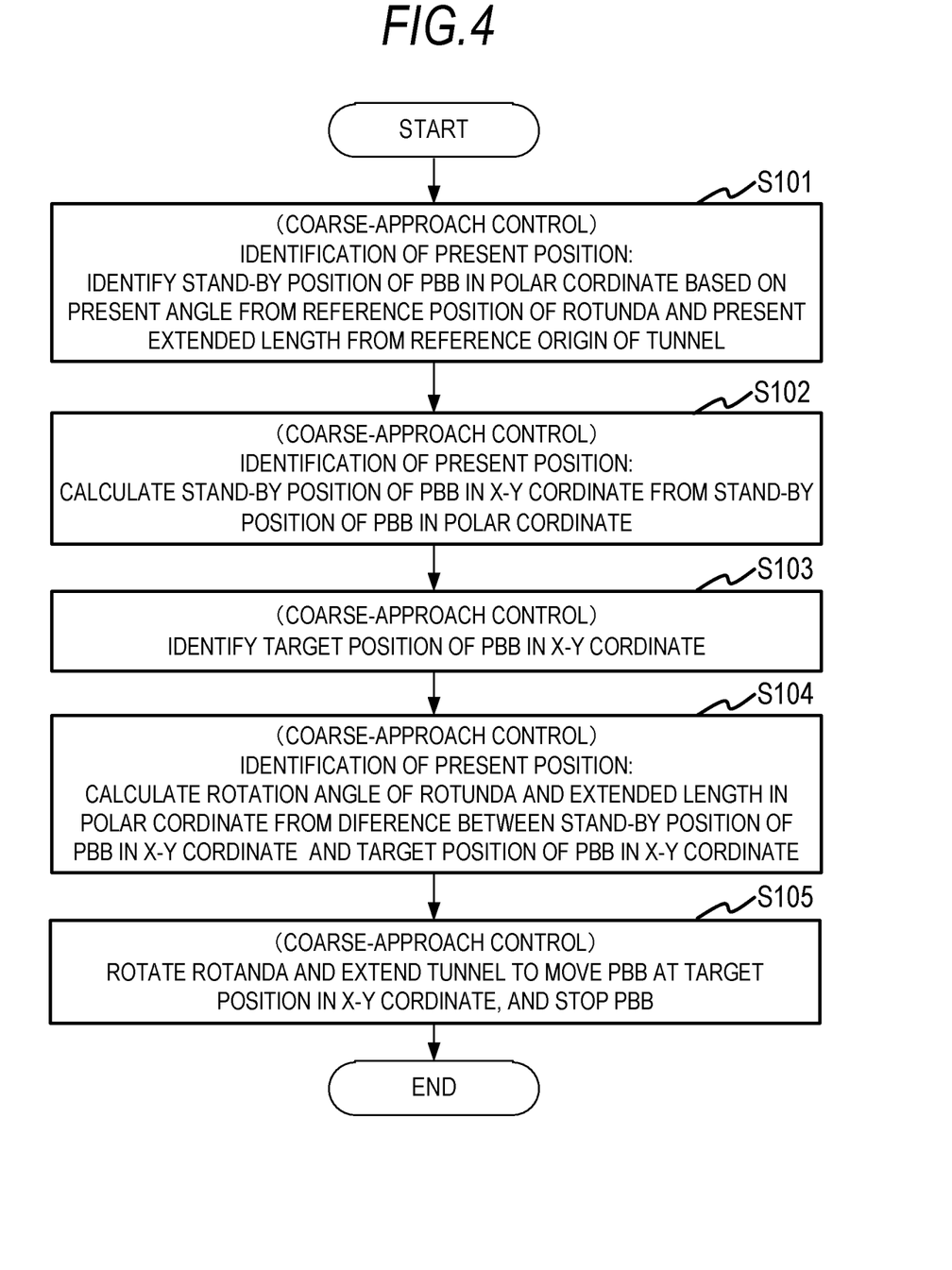
FIG. 4 is a drawing to show a flowchart of the coarse approach control.
Figure 5:
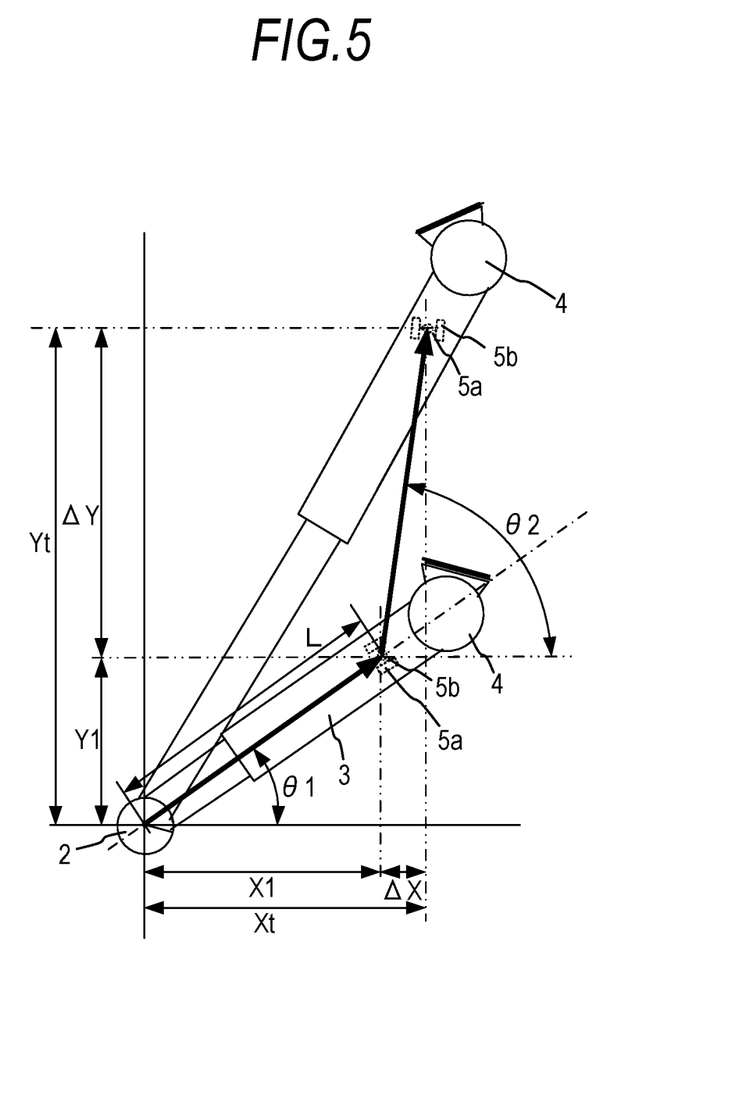
FIG. 5 is a drawing to show movement states of a PBB in the coarse approach control.

Next, with reference to FIGS. 4 and 5, a coarse approach control is explained. FIG. 4 shows the flowchart of processes in the coarse approach control. FIG. 5 shows the aspects of position and movement of the PBB 1 in the coarse approach control. The coarse approach control is a control of the movement of PBB 1 from the stand-by position in which the PBB is in a state in which the PBB 1 is away from an aircraft to the target position. In the coarse approach control, the target position can be defined as a final boarding-permission position where the PBB 1 contacts the passenger door to allow passengers to board on an aircraft in the case of boarding of the passengers onto an aircraft. That is, it is an example from the stand-by position to the final boarding-permission position.

At first, the first detection device identifies the present position (the present position in the polar coordinate) of the PBB 1 at the stand-by position around the origin point O in the polar coordinate. That is, at first, the first detection device measures the stand-by position angle θ1 of the rotunda 2 from the X-axis at the stand-by position, while the second detection device measures the stand-by position distance L of the tunnel portion 3 from the origin point O in the extensible/contractable direction. Although for example, the stand-by position distance L can be defined as a distance from the origin point O to the pivot axis center of the drive column 5, it can be defined at an arbitrary position in the extensible/contractable direction (S101).

After identifying the present position (the present position in the polar coordinate) of the PBB 1 at the stand-by position around the origin point O in the polar coordinate, the control device calculates the stand-by position coordinate data (stand-by position in the X-Y coordinate) including the distance X1 in the X axis and the distance Y1 in the Y axis from the origin point O at the stand-by position based on the stand-by position angle θ1 and the stand-by position distance L (S102). That is, the X1 and Y1 are determined as the following formula 1 and formula 2 based on θ1 and L.

$$X1 = L \cos \theta 1 \quad \text{(formula 1)}$$

$$Y1 = L \sin \theta 1 \quad \text{(formula 2)}$$

Here, the position of an aircraft at a parking apron is determined only with slight errors. Therefore, the target position of PBB 1 to be positioned with regard to aircrafts can be defined in advance. In the memory device, as described above, the target position coordinate data in the X-Y coordinate system with the origin point O is stored in advance. For example, with reference to the steering 5b, the target position coordinate data have the distance component Xt as a component value of steering 5b from the origin point O in the X direction and the distance component Yt as a component value of steering 5b from the origin point O in the Y direction. The target position of PBB 1 is identified by reading the target position coordinate data out from the memory device (S103).

Next, the difference values ΔX and ΔY are calculated, the difference values ΔX and ΔY being respectively as distance components in X axis direction and Y axis direction between the target position coordinate data and the stand-by position coordinate data. ΔX and ΔY are calculated as the following formula 3 and formula 4.

$$\Delta X = Xt - X1 \quad \text{(formula 3)}$$

$$\Delta Y = Yt - Y1 \quad \text{(formula 4)}$$

The X-Y coordinate data of the difference values ΔX and ΔY means the displacement amount of the PBB 1 in which the PBB 1 is to be moved to the target position. The converted amount in which the displacement amount is converted into values around the origin point O in the polar coordinate system is a necessary amount in which the PBB 1 must move. That is, the X-Y coordinate data of the difference values are converted into polar coordinate data having the difference angle θ2 of the rotunda 2 from the X axis around the origin point and the difference distance L2 of the tunnel 3 from the origin point in the extensible/contractable direction (S104). The difference angle θ2 and the difference distance L2 are defined as the following formula 5 and formula 6

$$\theta 2 = \tan^{-1}(\Delta Y / \Delta X) = \tan^{-1}(Yt - Y1 / Xt - X1) \quad \text{(formula 5)}$$

$$L2 = \sqrt{\Delta X^2 + \Delta Y^2} = \sqrt{(Xt - X1)^2 + (Yt - Y1)^2} \quad \text{(formula 6)}$$

And then, the control device controls the steering 5b to direct the steering into the direction in which the difference angle θ2 is added into the angle of the steering 5b at the stand-by position to move the drive wheel 5a with the difference distance L2 from the stand-by position to the target position. By this, the PBB 1 can be displaced to the target position (S105). Under no consideration of disturbances like frictional forces loaded on a pair of the drive wheels 5a, because each of the displacements of the drive wheels 5a is the same with each other in theory, the PBB 1 can be always positioned to the target position only by the above process to the target position. In practice, however, by an angle of the steering 5b or factors like frictional forces loaded on each of the pair of the drive wheels 5a, the displacements of the drive wheels 5a cause a difference so that the position to which the PBB 1 actually moves has an error from the target position. Therefore, until the PBB 1 reaches the final target position, it is necessary to set plural target positions, calculates an error per movement between target positions, reset a next target positions to cancel the error by the above process, and move the PBB 1 to the next target position. By repeating this process in plural times, the coarse approach control is completed.

As above, in the coarse approach control, the target position at which the PBB 1 reaches can be defined as the final boarding-permission position in which the PBB1 contacts the passenger door to allow passengers to board on an aircraft in the case of boarding of passengers to an aircraft. In contrast, it is applicable to set the target position in the coarse approach control at a middle target position, and add a process of a fine approach control next to the coarse approach control. That is, in the fine approach control, the target position in the coarse approach control can be set as a middle target position at which the connection portion 6 is away from the passenger door 52a of the aircraft 52 with a predetermined distance so that the fine approach control is available to a displacement process from the middle target position to the final boarding-permission position in which passengers are allowed to board on an aircraft.

Figure 6:
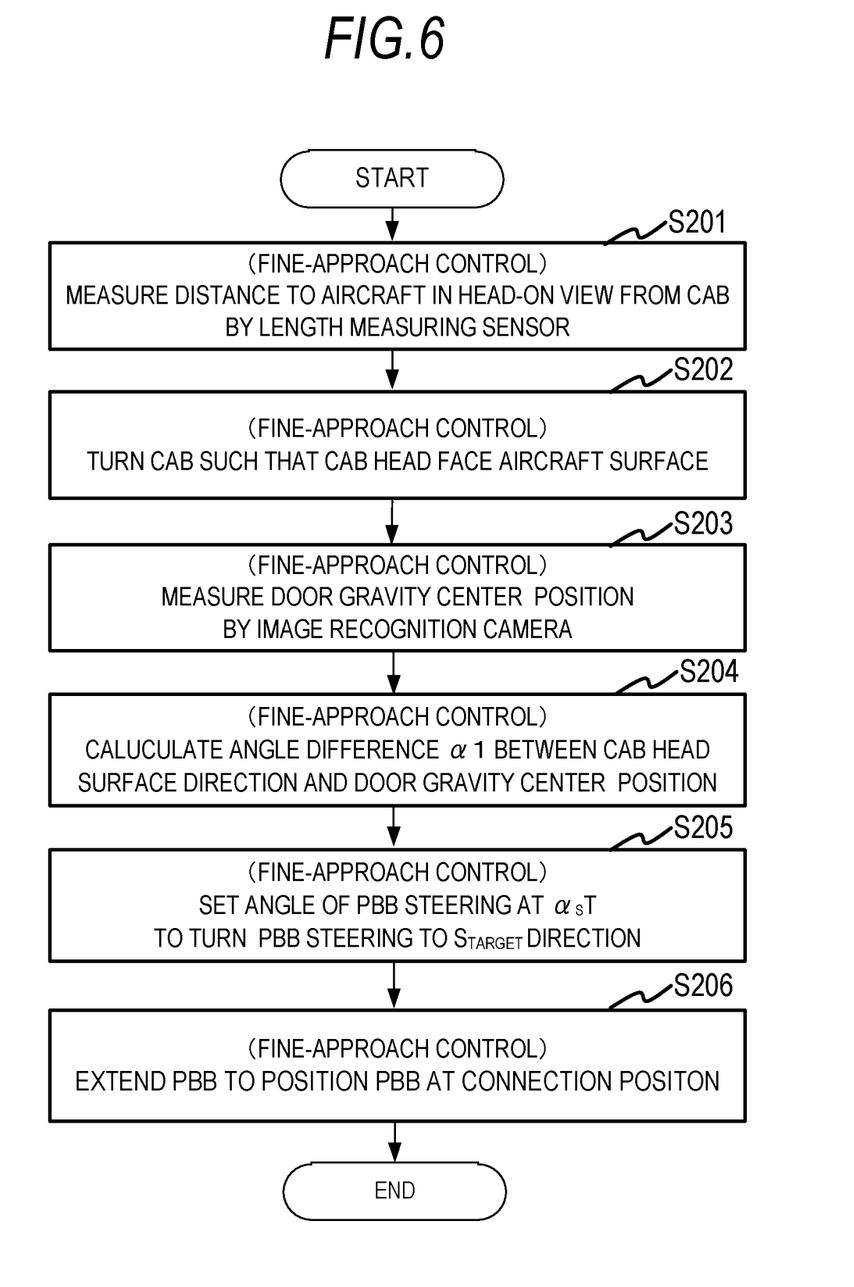
FIG. 6 is a drawing to show a flowchart of the fine approach control.
Figure 8:
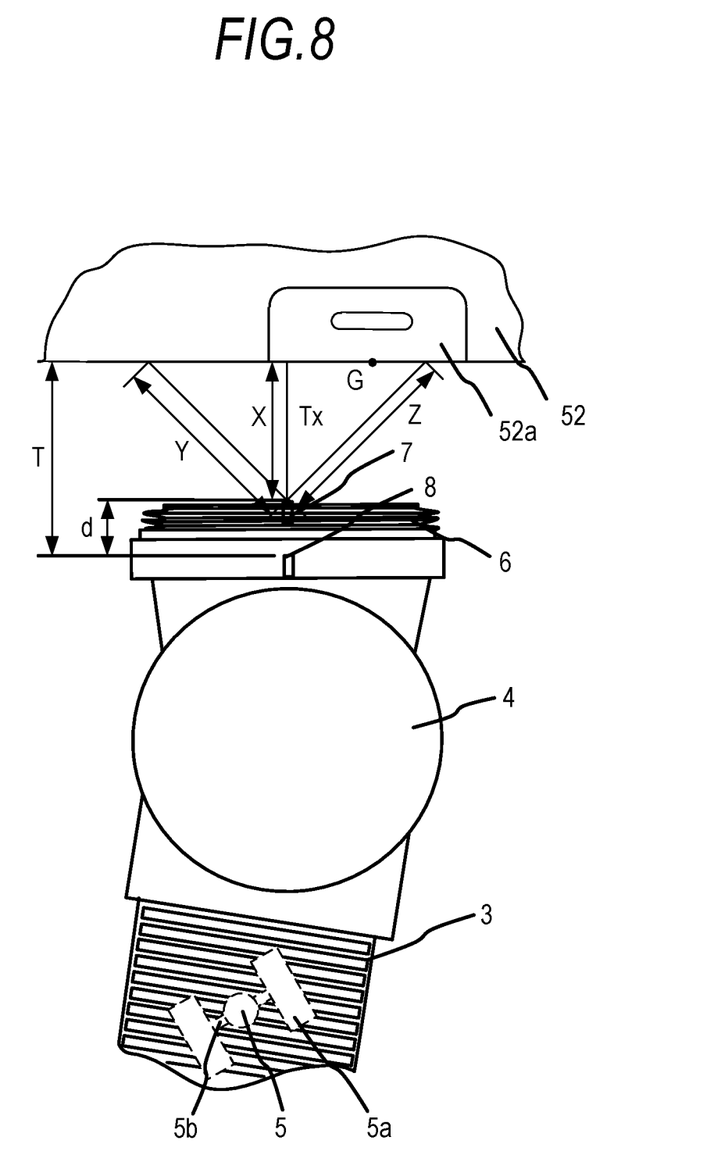
FIG. 8 is a drawing to show the position relationship between the cab and the aircraft in the state where the cab is at a face-to-aircraft position to the aircraft in the fine approach control.
Figure 9:
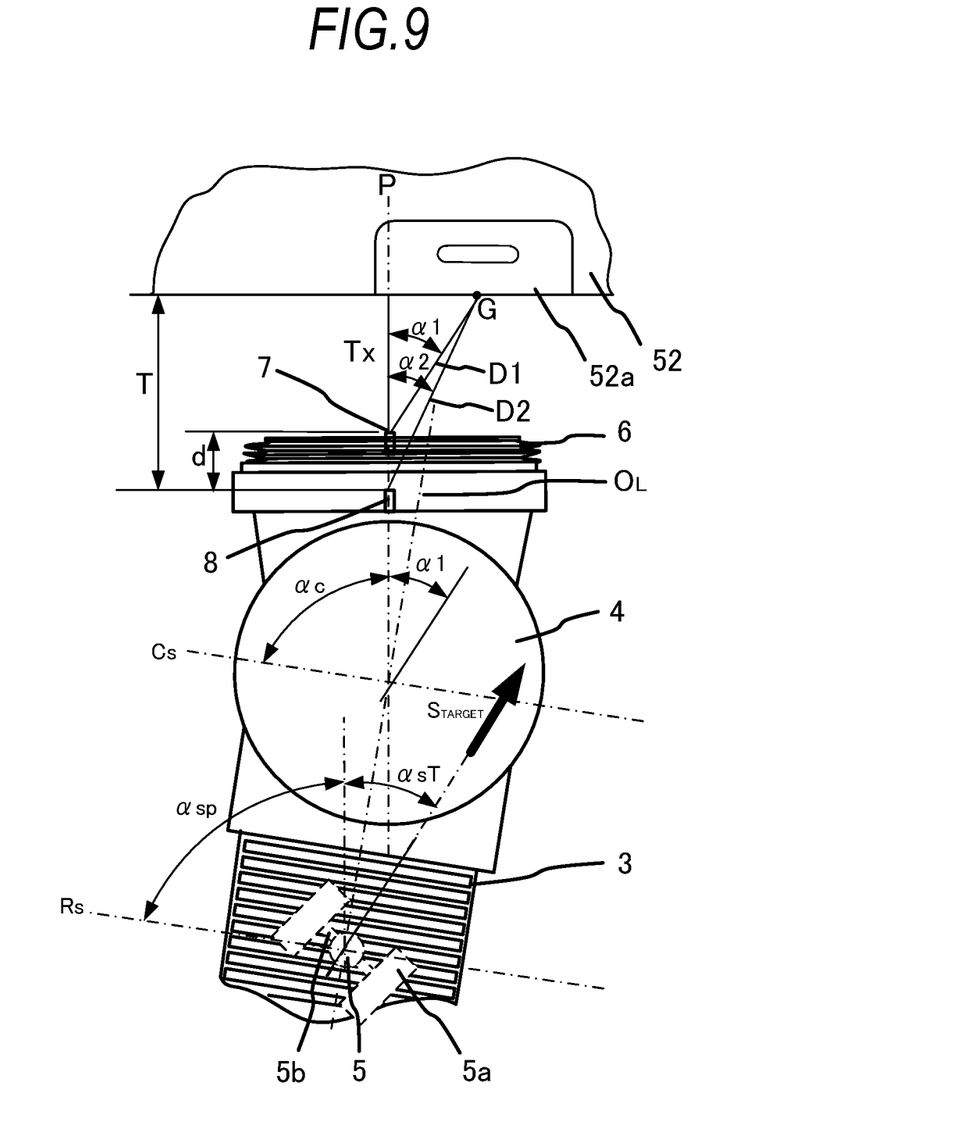
FIG. 9 is a drawing to show the position relationship with the setting of the steering, between the cab and aircraft in the state where the cab is at a face-to-aircraft position to the aircraft in the fine approach control.
Figure 10:
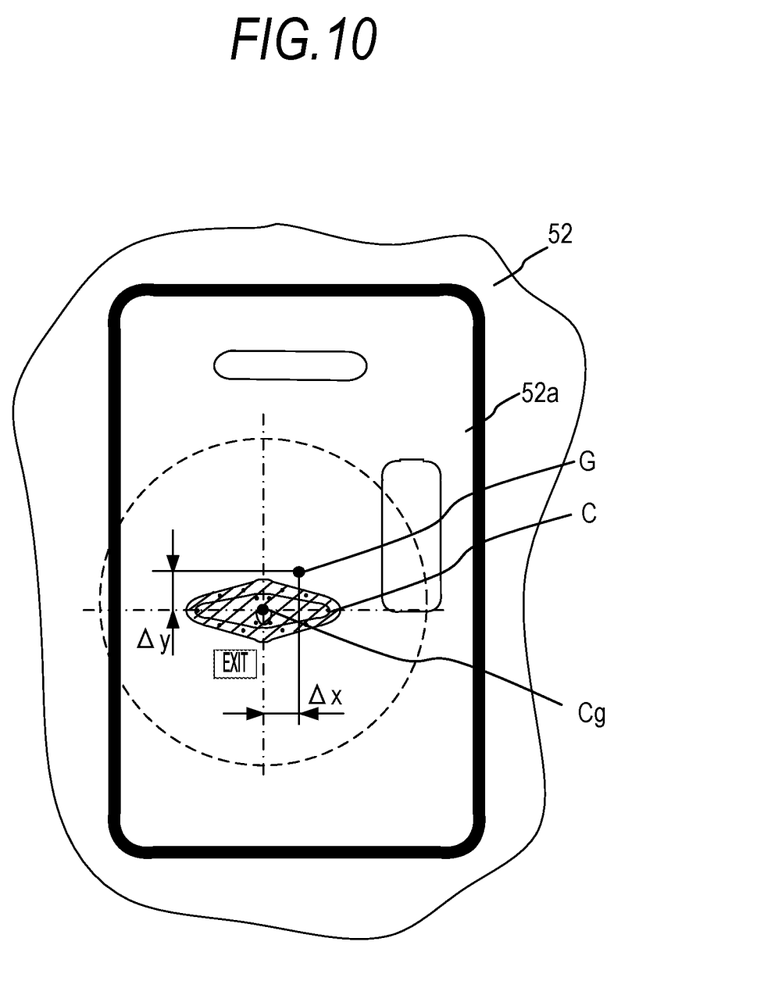
FIG. 10 is a drawing to show the concept of the identification method to identify the center of the passenger door by an image recognition in the fine approach control.
Figure 11:
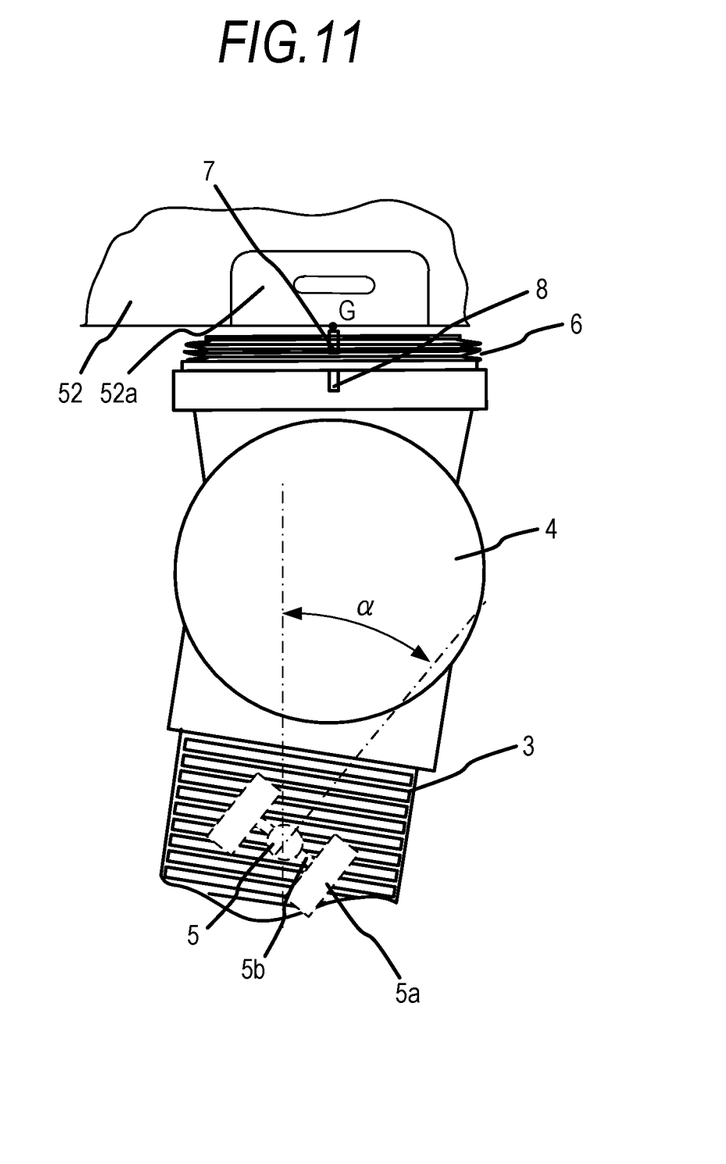
FIG. 11 is a drawing to show the position relationship between the cab and the aircraft in the state where the cab is connected to the aircraft in the fine approach control.

As below, with reference to FIGS. 6 to 11, the fine approach control is explained. FIG. 6 shown the flowchart of the fine approach control. FIGS. 7 to 9 and 11 show the states of the positions of the cab 4 in each process. FIG. 10 shows the passenger door 52a for passengers of the aircraft 52, used for position identification in the fine approach control.

The measurement sensor 7 configured to measure a distance to an object facing to and away from the sensor, and the imaging device 8 configured to achieves image recognition are provided on the cab 4. It is preferable to provide the measurement sensor 7 at the closest portion to the aircraft 52 in the case where the cab 4 connects the aircraft 52. Also, in general, it is preferable to provide the measurement sensor 7 at the center in the width direction of the cab 4 (a nose-to-tail direction of the aircraft 52). By this, the measurement sensor 7 can most precisely measure the distance between the cab 4 and the aircraft 52. The measurement sensor 7 has a sensor surface (a detection surface) configured to achieves measurement to the first direction X that is a normal direction of the cab surface, the cab surface defined as a surface in which the cab 4 faces to the passenger door of the aircraft 52 in the state where the PBB 1 is at the boarding-permission position to the aircraft 52 and the connection portion 6 connects the aircraft. The imaging device 8 has a sensor surface (an imaging surface) configured to take an image to the first direction X that is a normal direction of the cab surface. The imaging device 8 is provided to be away backward the measurement sensor 7 with the distance d so that the imaging area of the imaging device 8 encompasses the whole portion of the measurement area of the measurement sensor 7. Especially, the measurement sensor 7 and the imaging device 8 are provided so that the center of the imaging direction of the imaging device 8 coincides with the center of the measurement direction of the measurement sensor 7 and the positions of the sensor surface of the measurement sensor 7 and the sensor surface of the imaging device 8 are different. Here, the first direction X as the center axis of the measurement direction of the measurement sensor 7 and the imaging device 8 is defined as the aircraft surface vertical reference axis P. The measurement sensor 7 is defined as one piece of the measurement sensor 7 capable of measuring a distance between the measurement surface and an opposed surface in at least three directions including the first direction X as the normal direction of the cab surface. The three directions include the first direction X, the second direction Y defined as a direction on a nose side of the aircraft with a predetermined angle (e.g. 60 degrees) from the first direction, and the third direction Z defined on a tail side with the predetermined angle (e.g. 60 degrees) from the first direction, in a direction where the connection portion of the cab connects the aircraft. The imaging device 8 is preferably provided at the center of the width direction of the connection portion 6 with regard to the nose-to-tail direction of the aircraft 52. That is, a predetermined angle between the first direction X and the second direction Y has to be the same as a predetermined angle between the first direction X and the third direction Z.

Figure 7:
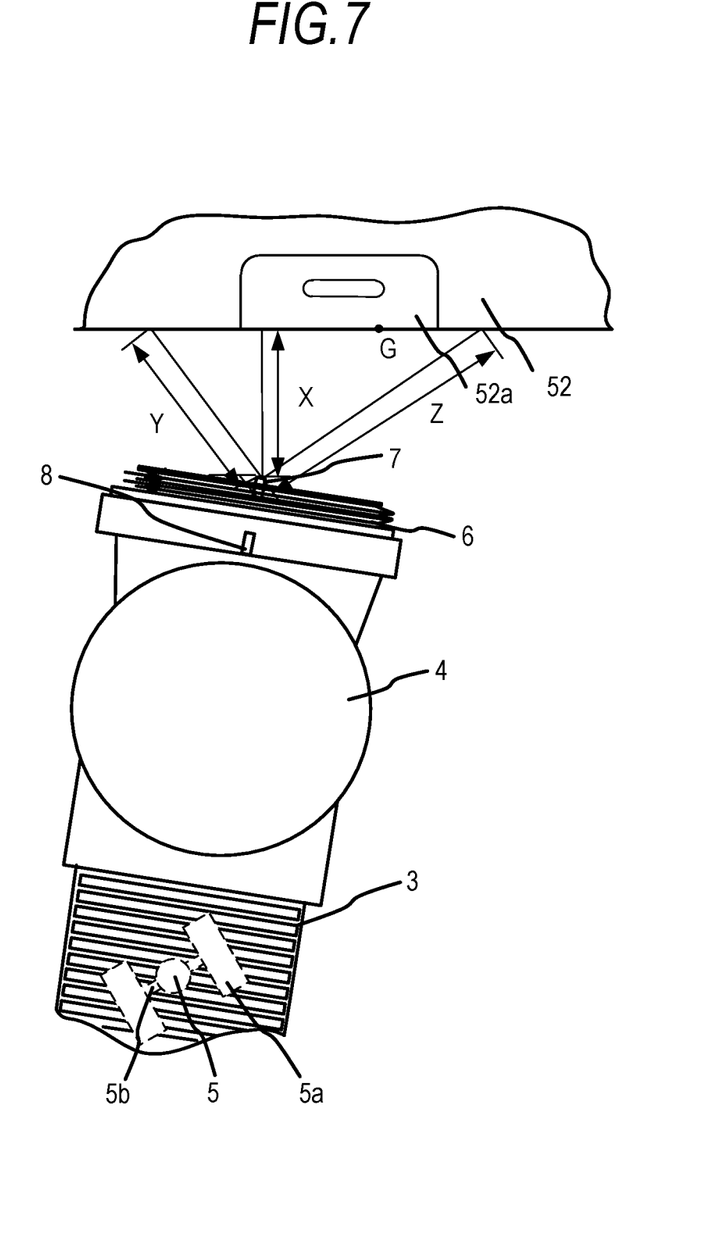
FIG. 7 is a drawing to show the position relationship between the cab and the aircraft in the state where the cab is at an angled position to the aircraft in the fine approach control.

The state in which the fine approach control starts is the state in which the connection portion 6 of the cab 4 is positioned at a position away substantially with a predetermined distance from the body of an aircraft after the coarse approach control. In this state, the measurement sensor 7 measures distances from the cab surface to the body surface of the aircraft in the three directions of X, Y and Z (S201). In this process, at first, the connection portion 6 of the cab 4 is skewed and not rightly face to body surface in many cases. That is, as shown in FIG. 7, the measured distance value in the second direction Y by the measurement sensor 7 is different from the measured distance value in the third direction Z by the measurement sensor 7.

Next, the cab 4 is directed to the direction in which the measured distance value in the second direction Y becomes the same as the measured distance value in the third direction Z (the position where the difference between the distance in the second direction Y and the distance in the third direction Z becomes zero) by rotating the connection portion 6 of the cab 4 to direct from the nose side to the tail side of the aircraft 52 or from the tail side to the nose side of the aircraft 52 (S202). This state corresponds to a state in which the cab surface rightly faces to the body surface of the aircraft 52, as shown in FIG. 8. The distance Tx in the first direction X in this state corresponds to the actual distance between the cab surface and the aircraft 52, so that it is necessary to make the connection portion 6 of the cab 4 approach to body of the aircraft with the distance Tx and be at the connection state (the state in FIG. 11). When the connection portion 6 of the cab 4 is approached to the body of the aircraft with the distance Tx, the position of the cab 4 is moved so that the measurement sensor 7 provided at the center in the width direction of the cab 4 directs to the center G of the passenger door 52a. In the case where the measurement sensor 7 is provided at the position shifted from the center in the width direction, the position of the cab 4 can be moved so that the measurement sensor 7 directs to the shifted position with the deviation of the shifted amount from the center G of the passenger door.

Next, the imaging device 8 performs image recognition by imaging of the passenger door 52a. The center G of the passenger door 52a is calculated by the image recognition (S203). The center G as the center-of-gravity of an area can be directly calculated by the image recognition of the passenger door. In this process, at first, it is identified, a contour of the passenger door 52a or a contour C of an arbitrary shape on the passenger door. For example, the contour C of the shape of the open/close handle lever (hatch in FIG. 10) of the passenger door 52a is recognized. The center-of-gravity Cg of the contour C is calculated from the image recognition of the contour C. Since the distance differences $\Delta Xcg$ and $\Delta Ycg$ between the center G of the passenger door 52a and the center-of-gravity Cg of the contour C are given in advance, the center G of the passenger door 52a can be calculated by adding the distance differences $\Delta Xcg$ and $\Delta Ycg$ into the position of the center-of-gravity Cg.

Next, it is explained, the control method to move the position of the cab 4 so that the measurement sensor 7 provided at the center in the width direction of the cab 4 directs the center G of the passenger door 52a, in the case where the connection portion 6 of the cab 4 is controlled to approach to the body of the aircraft with the distance Tx. At first, the residual angle $\alpha 1$ from the measurement sensor 7 to the center G of the passenger door 52a and the residual angle $\alpha 2$ from the imaging device 8 to the center position G of the passenger door 52a are measured (S204). Here, angles $\alpha 1$ and $\alpha 2$ are defined as plus (+) direction in a predetermined direction, while they are defined as minus (−) direction in an opposite direction, $$\alpha 1 = \tan^{-1}(\tan \alpha 1 \times ((Tx+d)/Tx)) \quad \text{(formula 7)}$$

Here, if the direction of the steering 5b of the drive column 5 is set to S TARGET that is the same direction as the residual angle $\alpha 1$ to the center G of the passenger door 52a from the measurement sensor 7 and the drive wheels is moved with the distance D1, the cab 4 can be connected to the passenger door precisely.

Here, in the position the rotation axis of the steering 5b of the drive column 5, the tunnel reference direction Rs is defined as a direction perpendicular to the lengthwise axis direction $O_L$ of the tunnel portion 3. Also, in the position of the rotation center of the cab 4, the reference direction of the cab 4 parallel to the tunnel reference direction Rs is defined as the cab reference direction Cs. That is, in the tunnel reference direction Rs and the cab reference direction Cs, an angle with regard to the lengthwise axis direction $O_L$ can be defined as a corresponding angle. At the position of the rotation axis of the steering 5b of the derive column 5 and the rotation center of the cab 4, the aircraft surface vertical reference axes P are parallel. And then, here, an angle $\alpha sp$ between the tunnel reference direction $R_s$ and the aircraft surface vertical reference axis P and an angle $\alpha c$ between the cab reference direction $C_s$ and the aircraft surface vertical reference axis P are measured. In this measurement, the direction of $S_{TARGET}$ is defined as the angle $\alpha_{ST}$ between the tunnel reference direction $R_s$ and the aircraft surface vertical reference axis P by the following formula. And then, the setting angle of the steering 5b of the drive column 5 is to be at the residual angle $\alpha_{ST}$ (S205).

$$\alpha_{ST} = \alpha_C + \alpha_1 - \alpha_{SP} \quad \text{(formula 8)}$$

That is, the PBB 1 is controlled so that the drive column 5 directs the center position G of the passenger door 52a from the imaging device 8. And then, the drive wheels 5a of the drive column 5 moves with the residual distance D so that the connection portion 6 of the cab 4 connects the portion of the passenger door 52a of the aircraft 52 (S206). The residual distance D1 to be moved by the drive wheels can be calculated by the following formula 9.

$$D1 = Tx/\cos \alpha 1 \quad \text{(formula 9)}$$

As above, by combining the coarse approach control and the fine approach control, the PBB 1 can be precisely connect to the passenger door. Especially, in the fine approach control, by means of the measurement sensor 7 and the imaging device 8 whose sensor surfaces are provided at the different positions, the precise approach can be achieved by correcting the direction of the steering 5b of the drive column 5.

This application claims the benefit of Japanese Patent Application No. 2019-024355, filed on Feb. 14, 2019, which is hereby incorporated by reference herein in its entirety.

REFERENCE SIGNS LIST 1 passenger boarding bridge (PBB)
2 rotunda 3 tunnel portion
4 cab
5 drive column
5a drive wheel
5b steering
6 connection portion
7 measurement sensor
8 imaging device
51 airport building
52 aircraft
52a passenger door

The invention claimed is:

1. A passenger boarding bridge which moves from a stand-by position away from an aircraft to a target position in a virtual coordinate having an origin point that is an intersecting point of a first axis parallel to a surface of an aircraft parking apron and a second axis perpendicular to the first axis, the aircraft being at a stop at a predetermined position on the aircraft parking apron with regard to a building of an airport, comprising:

a rotunda rotatably attached to the building around an axis extending from the origin point, the axis perpendicular to the first and second axes;

a tunnel portion whose one end is connected to the rotunda, the tunnel portion having a drive wheel and a steering supporting the drive wheel to rotate the drive wheel around a vertical axis and extensible and contractable in an extensible/contractable direction extending from the origin point by a drive of the drive wheel;

a cab connected to another end of the tunnel portion and having a connection portion contactable and opposed to a side surface of the aircraft, the connection portion being rotatable between a nose side and a tail side of the aircraft about the tunnel portion;

a control device configured to control a rotation angle of the steering and a drive of the drive wheel in a forward/backward direction; and a memory device storing a target position coordinate data including a distance from the origin point to the target position in a direction along the first axis and a distance from the origin point to the target position in a direction along the second axis, wherein the tunnel portion has a first detection device configured to detect an angle of the rotunda from the first axis around the origin point and a second detector configured to measure a distance of the tunnel portion from the origin point in the extensible/contractable direction, wherein the first detection device measures a stand-by position angle of the rotunda from the first axis at the stand-by position, and the second detection device measures a stand-by position distance of the tunnel portion from the origin point to a reference point in the extensible/contractable direction, wherein the control device calculates a stand-by position coordinate data including distances at the stand-by position from the origin point in the directions along the first and second axes based on the stand-by position angle and the stand-by position distance to convert component-differences of the target position coordinate data and the stand-by position coordinate data in the directions along the first and second axes to an angle-difference of the rotunda from the first axis around the reference point and a distant-difference of the tunnel portion from the reference point in the extensible/contractable direction, and wherein the passenger boarding bridge is controlled to move from the stand-by position to the target position by setting the rotation angle of the steering at the angle-difference and moves the drive wheel with the distant-difference, wherein the target position is a middle target position in which the connection portion is away from a passenger door of the aircraft with a predetermined distance, wherein the cab has:

one measurement sensor configured to measure distances between the cab and the aircraft in a first direction, a second direction, and a third direction, the first direction being a normal direction of a cab surface of which the cab faces to the passenger door of the aircraft, the second direction being defined as a direction on a nose side with a predetermined angle from the first direction, and the third direction being defined on a tail side with the predetermined angle from the first direction, in a direction where the connection portion of the cab connects the aircraft; and an imaging device configured to take an image in the normal direction of the cab surface and calculate a position of a center of the passenger door from the image, the imaging device being provided at a backward of the one measurement sensor to be away from the one measurement sensor so that the imaging device has an imaging direction that coincides with a center of a measurement direction of the one measurement sensor, wherein the control device rotates the cab to make a difference between the distance in the second direction and the distance in the third direction be zero, and wherein the control device calculates a residual-differential angle from a detection surface of the one measurement sensor in a nose-to-tail axis of the aircraft to the position of the center calculated by the imaging device, in the first direction, and a residual-differential distance between the detection surface of the one measurement sensor and the position of the center of the passenger door, and controls to set the rotation angle of the steering at the residual-differential angle and moves the drive wheel with the residual-differential distance to move the passenger boarding bridge from the middle target position to a boarding-permission position at which passengers are allowed to board the aircraft.

2. A passenger boarding bridge according to claim 1, wherein the target position is the boarding-permission position in which the connection portion is connected to the passenger door of the aircraft to allow the passengers to board on the aircraft.

3. A passenger boarding bridge according to claim 1, wherein the center calculated by the imaging device is a center-of-gravity of an area of a contour calculated by identifying a contour of a predetermined shape of the passenger door.

4. A passenger boarding bridge according to claims 1, wherein the first detection device is a potentiometer or a rotary-encoder and the second detection device is a potentiometer or a length-measurement sensor.

5. A passenger boarding bridge according to claim 2, wherein the first detection device is a potentiometer or a rotary-encoder and the second detection device is a potentiometer or a length-measurement sensor.

6. A passenger boarding bridge according to claim 3, wherein the first detection device is a potentiometer or a rotary-encoder and the second detection device is a potentiometer or a length-measurement sensor.

* * * * *